United States Patent [19]

Jacobsen

[11] Patent Number: 4,824,155
[45] Date of Patent: Apr. 25, 1989

[54] POWER-DRIVEN GRIPPER, ESPECIALLY FOR MANIPULATING MOULD PARTS AND COOPERATING COMPONENTS IN AN AUTOMATED FOUNDRY PLANT

[75] Inventor: Ole A. Jacobsen, Tisvildeleje, Denmark

[73] Assignee: Dansk Industri Syndikat A/S, Herlev, Denmark

[21] Appl. No.: 108,391

[22] Filed: Oct. 14, 1987

[30] Foreign Application Priority Data

Oct. 14, 1986 [DK] Denmark ............... 4897/86

[51] Int. Cl.⁴ .................................... B66C 3/16
[52] U.S. Cl. ........................................ 294/88; 294/97
[58] Field of Search ............ 294/2, 86.4, 88, 97, 294/106; 901/30, 31; 269/32, 34, 228, 239

[56] References Cited

U.S. PATENT DOCUMENTS 3,211,490 10/1965 Gardner et al. ................ 294/97
4,260,323 4/1981 Muntjanoff ................ 294/88 X
4,452,479 6/1984 Terai et al. ................ 294/88
4,615,374 10/1986 Persson ................ 164/412

Primary Examiner—Johnny D. Cherry
Assistant Examiner—Dean J. Kramer
Attorney, Agent, or Firm—Larson and Taylor

[57] ABSTRACT

In a gripper with two pivotable jaws (5,6) for engaging a core mask (7) or the like in an automated foundry plant, each jaw is actuated by a knee-joint linkage (18,22a and 19,22b respectively) with a common member (22) driven by a single hydraulic cylinder (24). By arranging the actuating mechanism as shown, it is possible (a) to move the two jaws between their gripping positions shown and their position of rest (not shown) by a single hydraulic cylinder or equivalent motor, and (b) to move the two jaws between said positions without risk of the jaws colliding with each other, as during the movement to the position of rest (not shown), the lower jaw (5) is swung into the gripper housing (9) before the upper jaw (6).

6 Claims, 3 Drawing Sheets

POWER-DRIVEN GRIPPER, ESPECIALLY FOR MANIPULATING MOULD PARTS AND COOPERATING COMPONENTS IN AN AUTOMATED FOUNDRY PLANT

TECHNICAL FIELD

The present invention relates to a gripper for manipulating objects or machine parts such as a core mask in an automated foundry plant.

BACKGROUND ART

A gripper of the kind mentioned above is disclosed in the Danish patent application No. 1683/83 or U.S. Pat. No. 4,615,374 (Persson). In this previously known gripper, the two gripping jaws are operated by mechanically separate mechanisms, each driven by its own hydraulic cylinder. Although this previously known gripper has proved satisfactory in many respects, it suffers from two distinct disadvantages, i.e.

(a) that two separate hydraulic cylinders are required to perform what is in essence one single operation, i.e. moving the gripping jaws from the position of rest to the gripping position or vice versa, and (b) that special hydraulic control measures are required to prevent the two jaws colliding with each other during the movements mentioned, especially during the movement away from the gripping position.

DISCLOSURE OF THE INVENTION

It is the object of the present invention to provide a gripper of the kind referred to initially, which does not suffer from the disadvantages mentioned above, and further is highly reliable in operation and relatively simple to manufacture at low cost, and this object is attained with a gripper of the kind referred to above which according to the present invention is characterized by the features set forth herein.

With such an arrangement, the requisite coordination of the movements of the two jaws is attained by means of a purely mechanical interconnection between the operating mechanisms for the two gripping jaws, said mechanical interconnection at the same time being utilized for transmitting the operating forces, so that only one hydraulic cylinder (or other suitable motor) is required. The use of only a single cylinder provides for the additional advantage that the time required for the movement is reduced to approximately one-half of the time previously required.

BRIEF DESCRIPTION OF THE DRAWING

In the following detailed specification the invention is explained with reference to the drawings, in which FIGS. 1(a)–1(d) an automatic foundry manipulator, illustrating one possible use of a gripper according to the invention.

DESCRIPTION OF THE PREFERRED EMBODIMENT

Figure 1:
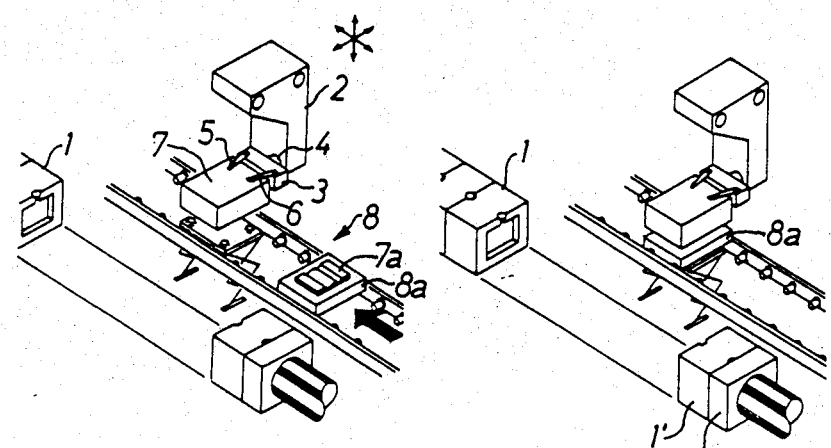
Figure 1:
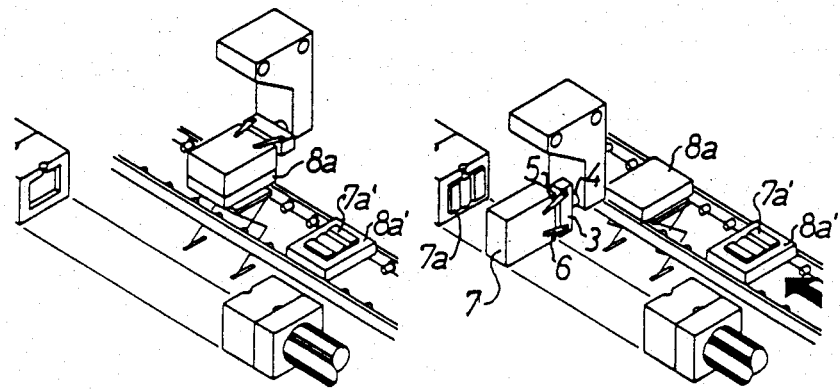

FIGS. 1a–d show an example of the use of the gripper according to the present invention. These Figures show a part of an automated foundry plant, in which a mould 1 is provided with cores delivered by a conveyor 8 by means of a mechanical manipulator 2, movable in three directions at right angles to each other. The manipulator 2 comprises a gripper 3, rotatably mounted on the manipulator 2 by means of a shaft 4, so that it may be oriented in various directions as indicated on the drawing. The structure carrying the manipulator is not shown, but may comprise known components adapted to perform the requisite movements of the manipulator 2 and the gripper 3, as well as actuating the latter's two gripping jaws 5 and 6. In operation, the manipulator 2 is moved between the various positions shown, so that the gripper 3 may grip a core mask 7 which, e.g. by using suction, picks up a core 7a having been delivered on a conveyor pallet 8a by the conveyor 8, and move the core mask 7 with the core 7a for inserting the latter into its proper position in the mould 1, if necessary also performing other operations shown, but not directly relevant to the present invention. After the insertion of the core 7a a new mould 1' is conveyed to the mould 1 by a pusher 1a, after which the conveyor 8 delivers a new pallet 8a' with anew core 7a', whereupon the process continues in a cyclic manner as described. The gripper 3 engages and disengages the mould part 7 by suitable movement of the gripping jaws 5 and 6, to be described below with reference to FIGS. 2 and 3.

Figure 2:
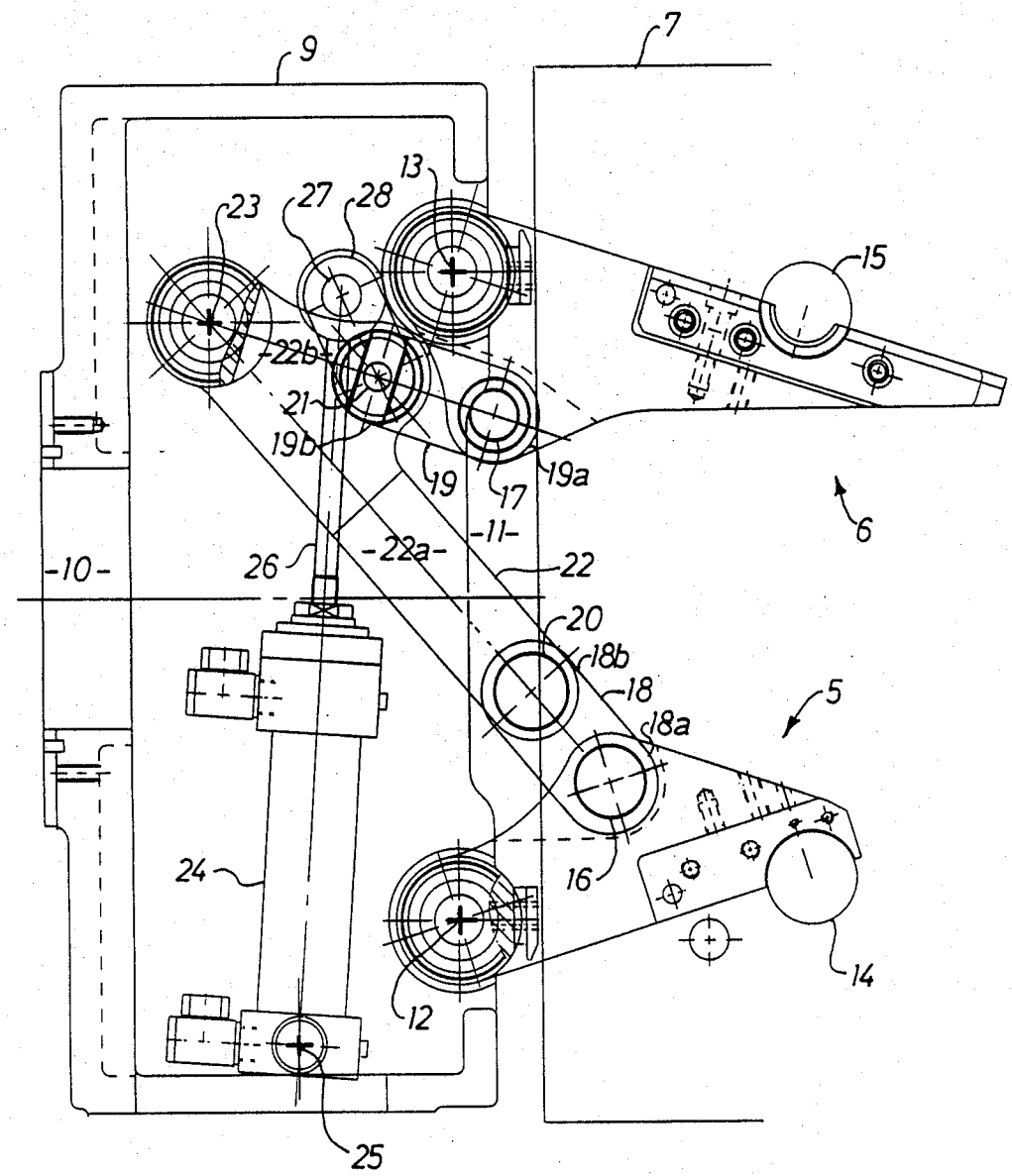
FIGS. 2 and 3 show the gripper with its jaws in their gripping position and their position of rest respectively, drawn as if the various parts were partly transparent.
Figure 3:
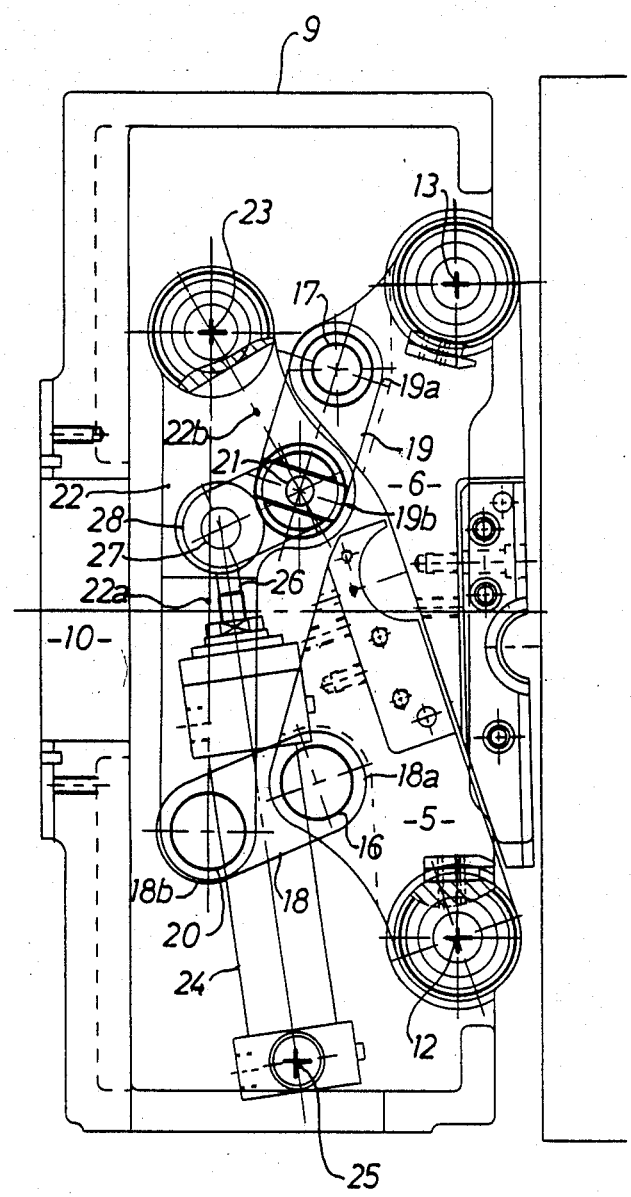

As can be seen from FIGS. 2 and 3, the gripper 3 comprises a box-shaped housing 9 with a socket 10 for securing the housing 10 to the shaft 4 (not shown in FIGS. 2 and 3) as well as an opening 11 to allow the movement of the two gripping jaws, i.e. a first gripping jaw 5 and a second gripping jaw 6, out of and into the box-shaped housing 9.

The housing 9 comprises four mutually parallel bearings or bearing shafts, which are stationary—except for minor adjustments—in the housing 9 and serve as fixed pivots for the mechanism now to be described. In the following, they will be identified by reference numbers connected to their axis points in the drawing.

The first gripping jaw 5 is pivotably supported by a first gripping-jaw bearing 12, and the second gripping jaw 6 is pivotably supported by a second gripping-jaw bearing 13 in the manner shown, so that the two jaws 5 and 6 may be swung out of and into the box-shaped housing 9 between the positions shown in FIGS. 2 and 3. In the gripping position shown in FIG. 2, the jaws 5 and 6 each engage an engagement knob 14 and 15 respectively on the core mask 7. The engagement knobs 14 and 15 and the portions of the jaws 5 and 6 adapted to engage them may be shaped in a suitable manner to ensure a firm grip, e.g. as shown and described in the above-mentioned references.

In the position of rest shown in FIG. 3, the jaws 5 and 6 are withdrawn into the housing 9 in such a manner, that the first jaw 5 is behind the second jaw 6. This space-saving arrangement is analogous to the arrangement shown and described in the above-mentioned references.

In order to effect the requisite movements of the gripping jaws 5 and 6 into or out of the housing 9, each jaw has an eccentrically placed actuating pin 16 and 17 respectively, of which the first actuating pin 16 is connected to a first end 18a of a first link 18 and the second actuating pin 17 to a first end 19a of a second link 19. The second end 18b of the first link 18 is connected to a first link pin 20 on a common lever 22—designated "common" because of it being a component in two otherwise independent mechanisms, one for each of the two gripping jaws 5 and 6 —pivotably supported in the housing 9 by means of a common-lever bearing 23, being one of the above-mentioned four mutually parallel bearings or bearing shafts, which are mounted stationary and adjustably in the housing 9. Similarly, the second end 19b of the second link 19 is connected to a second link pin 21 on the common lever 22. As may be seen from FIGS. 2 and 3, the first link pin 20 is placed on the common lever 22 at a considerably greater distance from the common-lever bearing 23 than the second link pin 21, for a purpose to be explained below.

By comparing FIG. 2 with FIG. 3, it may be seen that the mechanism actuating each to the two gripping jaws 5 and 6 constitute components parts of a knee-joint linkage, the first of which consists partly of the first part 22a of the common lever 22 extending from its housing bearing 23 to its first link pin 20, partly of the first link 18, whereas the other knee-joint linkage consists partly of the second part 22b of the common lever 22 extending from the bearing 23 to its second link pin 21, partly of the second link 19. As will be seen from FIGS. 2 and 3, the parts 22a and 22b of the common lever 22, constituting the "inner" parts of the two knee-joints linkages mentioned, have different lengths, the first part 22a being considerably longer than the second part 22b. By placing the common-lever bearing 23 much closer to the second jaw bearing 13 than to the first jaw bearing 12, and by arranging the actuating pins 16 and 17 on the jaws 5 and 6 and the link pins 20 and 21 on the common lever 22 in the manner shown, it is possible (a) to obtain a situation, shown in FIG. 2, with two "stiff knees", in which the two gripping jaws 5 and 6 are held in firm engagement with the cooperating engagement knobs 14 and 15 respectively, thus holding the core mask 7 securely in a fixed position relative to the gripper housing 9, and (b) to obtain a situation, shown in FIG. 3, with "both knees bent", in which both jaws 5 and 6 are withdrawn, with the first jaw 5 lying behind the second jaw 6. The movement from the gripping position shown in FIG. 2 to the position of rest shown in FIG. 3 and vice versa is effected by means of a double-acting hydraulic cylinder 24 (or an equivalent linear motor) pivotably supported in the housing 9 by a cylinder bearing 25, and having its piston rod 26 adapted to move the common lever 22, in the example shown through a third link pin 27 on an extension 28 of the second link 19 set at an angle to the latter.

By connecting the piston rod 26 to the link pin 27 on the extension 28 the advantage is obtained that during the initial movement away from the gripping position a greater turning force on the common lever 22 is obtained than if the piston rod 26 were directly connected to the common lever 22, as the combination of the second link 19 and the extension 28 act like a one-armed lever with its fulcrum in the second actuating pin 17, the latter—provided a core mask 7 is present—being fixed relative to the housing 9 during the initial movement of the piston rod 26.

When, starting from the gripping position shown in FIG. 2, the piston rod 26 moves inward into the cylinder 24, it will pull the third link pin 27 and hence the extension 28 downwards (as seen on the drawing), thus flexing the knee joint in the upper or second knee-joint linkage 19,22b. Since one part, viz. the part 22b, of this upper or second linkage is integral with one part, viz. the part 22a, of the lower or first knee-joint linkage 18,22a, the latter will also have its knee joint flexed, and due to the part 22a in the lower linkage being much longer than the corresponding part 22b in the upper linkage, the knee joint of the lower linkage will initially move much faster than that of the upper linkage, so that the first or lower jaw 5 will swing into the housing 9 before the second or upper jaw 6, thus ensuring that the two jaws do not collide with each other during the inward movement into the housing 9. The relative lengths of the various links and levers and the positions of the various bearings and link pins are such, that the inward movement may be terminated with the two jaws 5 and 6 in the positions shown in FIG. 3, cf. also the next paragraph.

Preferably, in the gripping position shown in FIG. 1, the piston rod 26 is in its outermost end position in the cylinder 24, so that the "stiff-knee" situation may be obtained by simply admitting hydraulic fluid into the cylinder portion in question and letting it move the piston until it stops at the end abutment in question inside the cylinder. Similarly, the arrangement may be such, that when the jaws 5 and 6 are in the withdrawn position, the piston rod is in its innermost end position in the cylinder 24, so that no further stops or the like are required to hold the various parts of the mechanism in this position, the fluid pressure holding the piston against the other end abutment inside the cylinder 24. In the exemplary embodiment shown, however, the various moving parts are shaped, situated and dimensioned in such a manner, that during the movement from the gripping position shown in FIG. 2 to the position of rest shown in FIG. 3, the first jaw 5 will swing a little further anti-clockwise from the position shown in FIG. 3, after which it swings clockwise and abuts against the inward side of the second arm 6, and this abutting action will then constitute an end stop abutment for the entire mechanism, including the piston rod 26.

Certain adjustment facilities may be found useful, especially means for fine-adjusting the position of the four bearings 12, 13, 23 and 25, and of these especially the cylinder bearing 25 with a view to obtaining an effective "stiff-knee" position as shown in FIG. 2. It should be noted, however, that a "stiff-knee" position does not necessarily have to be a position, in which the three bearing and link pin centres in each knee-joint linkage are exactly aligned, as it may be useful with a view to obtaining a certain controlled holding force against the two engagement knobs 14 and 15 to use a gripping position, in which "the knees are slightly bent", i.e. in which the intermediate link pin centre is stopped just before reaching the "stiff-knee" position. Such a deviation would hardly be visible on a drawing of the scale used here. On the other hand, provided that a certain resiliency is present, such as in the engagement knobs 14 and 15 or the means securing them to the core mask 7, the over-centre effect used in various known toggle mechanisms could also be used, with the advantages known from such mechanisms, i.e. a locking effect combined with a certain minimum holding force, making it (at least theoretically) possible to release the fluid pressure on the cylinder 24, until the gripping jaws are to be moved back to the position of rest.

FIGS. 2 and 3 do not show the relative positions of the various mechanism components in a direction at right angles to the plane of the drawing. It is considered, however, that a mechanical technician of average knowledge and skill would be able to design and construct a mechanism functioning in the manner described and shown, solely on the basis of the present specification and the attached drawing.

It is, of course, also possible to use a single-acting hydraulic cylinder (or equivalent linear motor) cooperating with a suitable return spring, instead of the double-acting cylinder 24 shown and described. This would result in a further simplification of the control of the hydraulic cylinder, as there would simply be the two commands "pressure on" and "release pressure". Using in this case the "pressure-on" position as the gripping position would provide control of the gripping force, whereas using the "release-pressure" position as the gripping position would provide a fail-to-safety function preventing loads being inadvertently dropped due to failure of the hydraulic equipment supplying the pressure fluid—such as a leak in one of the flexible tubes carrying pressure fluid to and from the hydraulic cylinder. In this connection, it should be noted that the gripping force in the last-mentioned alternative may be quite substantial, as the force transmission ratio from a return spring acting coaxially with the hydraulic cylinder to the engagement parts of the gripping jaws 5 and 6 is very high (theoretically approaching infinity) due to the knee-joint effect.

I claim:

1. A gripper (3) for manipulating objects or machine parts, such as a core mask (7) in an automated foundry plant and of the kind comprising
   (a) a gripper base (9),
   (b) a first gripping-jaw bearing (12) substantially fixedly positioned on said base (9),
   (c) a second gripping-jaw bearing (13) substantially fixedly positioned on said base (9) a distance from said first gripping-jaw bearing (12),
   (d) a first gripping jaw (5) having a first actuating pin (16) eccentrically spaced from said first gripping jaw bearing (12) and being pivotably supported about said first gripping-jaw bearing (12) and adapted to be moved between
      (d1) a gripping position extending from said gripper base (9), and
      (d2) a rest position withdrawn to said gripper base (9),
   (e) a second gripping jaw (6) having a second actuating pin (17) eccentrically spaced from said second gripping jaw bearing (13) and being pivotably supported about said second gripping-jaw bearing (13) and adapted to be moved between
      (e1) a gripping position extending from said gripper base (9), and
      (e2) a rest position withdrawn to said gripper base (9) and is positioned outside of and close to the withdrawn first gripper jaw (5), and
   (f) actuating means (18,19,22,24,26) for providing mutually coordinated movements of the two gripping jaws (5,6) between said gripping positions and rest positions, characterized in
   (g) that said actuating means comprises two mechanically interconnected knee-joint mechanisms (18,22a,19,22b), one for each said gripping jaw (5,6), each of said knee-joint mechanisms having a respective first end pivotably secured to a bearing (23) on said gripper base (9) and a respective second end pivotably connected with the respective actuating pin (16,17) of the respective gripping jaw (5,6), said knee-joint mechanisms being thus dimensioned and situated
      (g1) that when said actuating means is made to move the gripping jaws (5,6) from the gripping position to the rest position, the first gripping jaw (5) will initially move faster than the second gripping jaw (6), and
      (g2) that when this movement is completed, the second gripping jaw (6) will be positioned outside of the first gripping jaw (5).

2. A gripper according to claim 1, characterized in that the knee-joint mechanisms and the gripper jaws are shaped, situated and dimensioned in such a manner, that the first gripping jaw (5) reverses its direction of movement during the final phase of its movement from the gripping position to the rest position, whereupon the first gripping jaw (5) abuts with an outward side against an inward side of the second gripping jaw (6).

3. A gripper according to claim 1, characterized in that those parts (22a,22b) of the two knee-joint mechanisms (18,22a,19,22b) comprising said first ends are constituted by a common lever (22) with one of its ends pivotably secured in a single bearing (23) on said gripper base (9), said common lever (22) comprising a first knee point in the knee joint (20) for the knee-joint mechanism (18,22a) for the first gripping jaw (5), said first knee point being relatively distant from said one end adjacent the single bearing (23), as well as a second knee point in the knee joint (21) for the knee-joint mechanism (19,22b) for the second gripping jaw (6), said second knee point being comparatively close to said one end adjacent the single bearing (23), said common lever (22) being adapted to be swung in both directions about said bearing (23) by a double-acting motor (24) pivotably supported on said gripper base (9), a working member (26) of said motor (24) being connected to said common lever (22).

4. A gripper according to claim 3, characterized in that the working member (26) of the motor (24) is pivotably connected to one arm (28) of a two-armed lever (28,19), the other arm (19) of which constitutes the linkage connection between the second knee point and the actuating pin (17) of the second gripping jaw (6).

5. A gripper according to claim 1, characterized by such an arrangement that the knees of the knee-joint mechanisms are generally straightened out when the gripping jaws (5,6) are in the gripping position.

6. A gripper according to claim 5, characterized in that the pivot bearing (23) for said common lever (22) is adjustable in relation to the gripper base (9).

* * * * *